United States Patent
Battistello et al.

(10) Patent No.: US 9,755,829 B2
(45) Date of Patent: Sep. 5, 2017

(54) GENERATION OF CRYPTOGRAPHIC KEYS

(71) Applicant: OBERTHUR TECHNOLOGIES, Colombes (FR)

(72) Inventors: Alberto Battistello, Colombes (FR); Christophe Giraud, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/572,163

(22) Filed: Dec. 16, 2014

(65) Prior Publication Data

US 2016/0072627 A1    Mar. 10, 2016

(30) Foreign Application Priority Data

Dec. 17, 2013  (FR) ...................................... 13 62830

(51) Int. Cl.
*H04L 9/08* (2006.01)
*H04L 9/00* (2006.01)
*H04L 9/30* (2006.01)

(52) U.S. Cl.
CPC ............ *H04L 9/0861* (2013.01); *H04L 9/004* (2013.01); *H04L 9/30* (2013.01)

(58) Field of Classification Search
None
See application file for complete search history.

(56) References Cited

U.S. PATENT DOCUMENTS

| | | | |
|---|---|---|---|
| 6,389,136 B1 * | 5/2002 | Young et al. ......... | H04L 9/0894 380/28 |
| 7,215,773 B1 * | 5/2007 | Johnson ................ | H04L 9/3066 380/259 |
| 7,437,568 B2 * | 10/2008 | Das-Purkayastha et al. ..................... | G06F 21/552 380/277 |
| 7,512,231 B2 * | 3/2009 | Okeya ..................... | G06F 7/723 380/28 |

OTHER PUBLICATIONS

Matt Johnston: "Dropbear—a SSH2 server; genrsa.c", Jan. 1, 2003 (Jan. 1, 2003), XP055151175, Extra it del' Internet: URL:http://people.inf.elte.hu/nukesz/full/ genrsa.c [extrait le Nov. 5, 2014] * le document en entier.

(Continued)

*Primary Examiner* — Peter Poltorak
(74) *Attorney, Agent, or Firm* — Young & Thompson

(57) ABSTRACT

Method for generating a pair of public and private cryptographic keys in the additive group of integers modulo n, where n is the product of two prime numbers p and q, the method including the following steps:
  calculating a public exponent e for said public key, and
  calculating a private exponent d for said private key from said public exponent and said public modulus, where $d \cdot e = 1 \mod \lambda(n)$, $\lambda(n)$ being the least common multiple between p-1 and q-1, characterized in that the method furthermore comprises a step:
  of checking to check that $\lambda(n) = 0 \mod (p-1)$ and $\lambda(n) = 0 \mod (q-1)$.

8 Claims, 2 Drawing Sheets

(56) References Cited

OTHER PUBLICATIONS

Donald L Evans et al: "FIPS Pub 140-2: Security Requirements for Cryptographic Modules", Federal Information Processing Standards Publication, Mar. 12, 2002 (Mar. 12, 2002), pp. i-61, XP055138700, Extrait de 1 I Internet: URL:http://csrc.nist.gov/publications/fips /fips140-2/fips1402.pdf [extrait le Sep. 8, 2014] * section 4.9.2.
Camille Vuillaume et al: "RSA Key Generation: New Attacks" In: "Field Programmable Logic and Application", Jan. 1, 2012 (Jan. 1, 2012), Springer Berlin Heidelberg, Berlin, Heidelberg, XP055137811, ISSN: 0302-9743 ISBN: 978-3-54-045234-8 vol. 7275, pp. 105-119, 001: 10.1007/978-3-642-29912-4 9, * section 5 *.
FR Search Report, dated Nov. 6, 2014, from corresponding FR application.

* cited by examiner

GENERATION OF CRYPTOGRAPHIC KEYS

BACKGROUND OF INVENTION

The present invention relates to the field of computer security. It relates particularly to the protection of cryptographic methods implementing pairs of public and private keys.

DESCRIPTION OF THE RELATED ART

Some cryptographic systems carrying out methods such as, for example, the digital signature of a message or its encryption, require the generation of pairs of cryptographic keys. The public key is shared in clear text by the cryptographic system with the destination systems of the processed message while the private key is kept secret.

The generation of the pairs of public and private keys being a sensitive operation, test mechanisms are normally provided to check their integrity.

For example, the American standard FIPS 140-2 published by the NIST (acronym for "National Institute of Standards and Technology") provides a test of this type (entitled "pair-wise consistency test").

In the case of RSA cryptographic methods (acronym for "Rivest Shamir Adelman"), the pair of keys is obtained in the following manner.

In order to obtain p and q, two large prime numbers, the following two steps are repeated:
 obtaining two candidate numbers p and q from numbers randomly drawn from the set $Z_n$ of the additive group of integers modulo n, and
 testing the primality of the p and q candidate numbers (for example according to a probabilistic primality test, for example, a Miller-Rabin test, for example according to the FIPS 140-2 standard,
 until a prime number is obtained.

The product of the numbers p and q thus forms a number n (n=p·q).

The number $\Phi(n)=(p-1)\cdot(q-1)$ is then calculated ($\Phi$ being the Euler indicator function, or "totient").

The public key is then formed by the numbers n and e, where e, "the public exponent", is an integer such that:
 $1<e<\Phi(n)$, and
 e and $\Phi(n)$ are prime numbers among themselves (gcd(e, $\Phi(n)$)=1, "gcd" being the acronym for "greatest common divisor".

The private key for its part is formed by the numbers n and d, where d, "the private exponent", is an integer such that;
 $d\cdot e=1 \mod \lambda(n)$, where
 $\lambda(n)$ is the least common multiple between p-1 and q-1 ($\lambda(n)=\text{lcm}(p-1, q-1)$, "lcm" being the acronym for "least common multiple").

When the cryptographic method is an encryption of a message m (belonging to $Z_n$), the integrity test provided by the FIPS 140-2 standard can be summarized as follows:
1) the message m is encrypted with the public key in such a way as to obtain an encrypted message $c=m^e \mod n$,
2) the encrypted message c is decrypted with the private key in such a way as to obtain a decrypted message $m'=c^d \mod n$, and
3) it is checked that the initial message m and the decrypted message are the same (m'=m).

When the cryptographic method is a signature of a message m (m belonging to $Z_n$), the integrity test provided by the FIPS 140-2 standard can be summarized as follows:
1) the message m is signed with the private key in such a way as to obtain a signature $s=(m)^d \mod n$, (or possibly $s=(H(m))^d$, H being a hash function,
2) a value h' is calculated as $h'=s^e \mod n$, and
3) it is checked that the value h' calculated in this way and the message m are the same (or possibly that the value h' and the condensate of the message by the hash function are the same (h'=H(m)).

However, the inventors have noted that the integrity tests currently used could fail to detect some key pair generation errors. They have thus revealed a need to improve the reliability of key pair generation in cryptographic systems.

SUMMARY OF THE INVENTION

The present invention fits into this context.

A first aspect of the invention relates to a method for generating a pair of public and private cryptographic keys in the additive group of integers modulo n, where n is the product of two prime numbers p and q, the method comprising the following steps:
 calculating a public exponent e for said public key, and
 calculating a private exponent d for said private key from said public exponent and said public modulus, where $d\cdot e=1 \mod \lambda(n)$, $\lambda(n)$ being the least common multiple between p-1 and q-1,
 characterized in that the method furthermore comprises a step:
 of checking to check that $\lambda(n)=0 \mod (p-1)$ and $\lambda(n)=0 \mod (q-1)$.

A method according to the first aspect ensures resistance to the corruption of the keys during their generation, notably during the calculation of the least common multiple.

A method according to the first aspect notably ensures resistance to malicious attacks aimed at cryptographic methods implementing the generated keys.

Embodiments relate to a method for testing the integrity of cryptographic key generation comprising the following steps:
 generating a pair of cryptographic keys according to the first aspect,
 encrypting a message m with the public exponent e in such a way as to obtain an encrypted message c,
 decrypting said encrypted message c with said private key d in such a way as to obtain a decrypted message m', and
 comparing the message m with the decrypted message m'.

The method may furthermore comprise the following steps:
 encrypting (105) the decrypted message m' with the public exponent e in such a way as to obtain an encrypted message c',
 comparing the encrypted message c' with the encrypted message c.

For example, the method is carried out in an electronic device to counter a combination of a side-channel attack and an error injection attack, said combination being implemented during the performance of a cryptographic method implementing a pair of cryptographic keys.

A second aspect of the invention relates to a method for testing the security of an electronic device against an attack, said device implementing a generation of a public cryptographic key e and a private cryptographic key d in the additive group of integers modulo n, such that:
 $n=p\cdot q$, where p and q are prime numbers,
 $1<e<\Phi(n)$, where e and $\Phi(n)$ are prime numbers among themselves and $\Phi(n)=(p-1)\cdot(q-1)$, and d·e=1 mod λ(n), λ(n) being the least common multiple between p-1 and q-1, the method including a step of disrupting the calculation of the value λ(n), in such a way as to obtain, instead and in place of the value λ(n), a value λ'(n)=λ(n)/α, where α divides λ(n), said disruption resulting in the calculation of a private key d', instead and in place of the private key d such that d'·e=1 mod λ(n)/α.

A method according to the second aspect enables testing of the electronic devices implementing a generation of pairs of keys, by checking their response to the disruption of the calculation of the least common multiple.

A method according to the second aspect can be carried out in the industrial process of testing electronic devices implementing a cryptographic key generation, for example in a test laboratory. Said disruption step can enable the detection of a vulnerability in the resistance to a miscalculation of the value λ(n).

A third aspect of the invention relates to a computer program and a computer program product, and a storage medium for such a program and product, enabling a method according to the first or second aspect to be carried out when the program is loaded and executed by a processor of an electronic device, for example a cryptographic device.

A fourth aspect relates to an electronic device, for example a cryptographic device, configured to carry out a method according to the first aspect of the second aspect.

For example, a device according to the third aspect is a portable electronic entity.

The device according to the third aspect may be a chip card.

Other types of devices can be envisaged, notably security documents (electronic passport, electronic identity cards or the like), USB sticks, mobile telephones or "smartphones".

BRIEF DESCRIPTION OF THE DRAWING FIGURES

Other advantages, aims and characteristics of the present invention will become apparent from the detailed description which follows, given by way of a non-limiting example, with reference to the attached drawings, in which.

DETAILED DSCRIPTION OF THE INVENTION

Embodiments are described below. However, by way of introduction, a method for testing the integrity of cryptographic key pair generation is described. This test method can be used for cryptographic keys used in encryption and/or digital signature mechanisms. This method can therefore be used even before the subsequent use of the generated key pair is known.

It is assumed that a public cryptographic key (e, n) and a private cryptographic key (d, n) are generated such that:

n=p·q, where p and q are prime numbers,

1<e<Φ(n) and e and Φ(n) are prime numbers among themselves where (gcd(e, Φ(n))=1), avec Φ(n)=(p-1)·(q-1) (Φ being the Euler indicator function, or "totient"), and d·e=1 mod λ(n), λ(n) being the least common multiple between p-1 and q-1 (λ(n)=lcm(p-1, q-1)).

Figure 1:
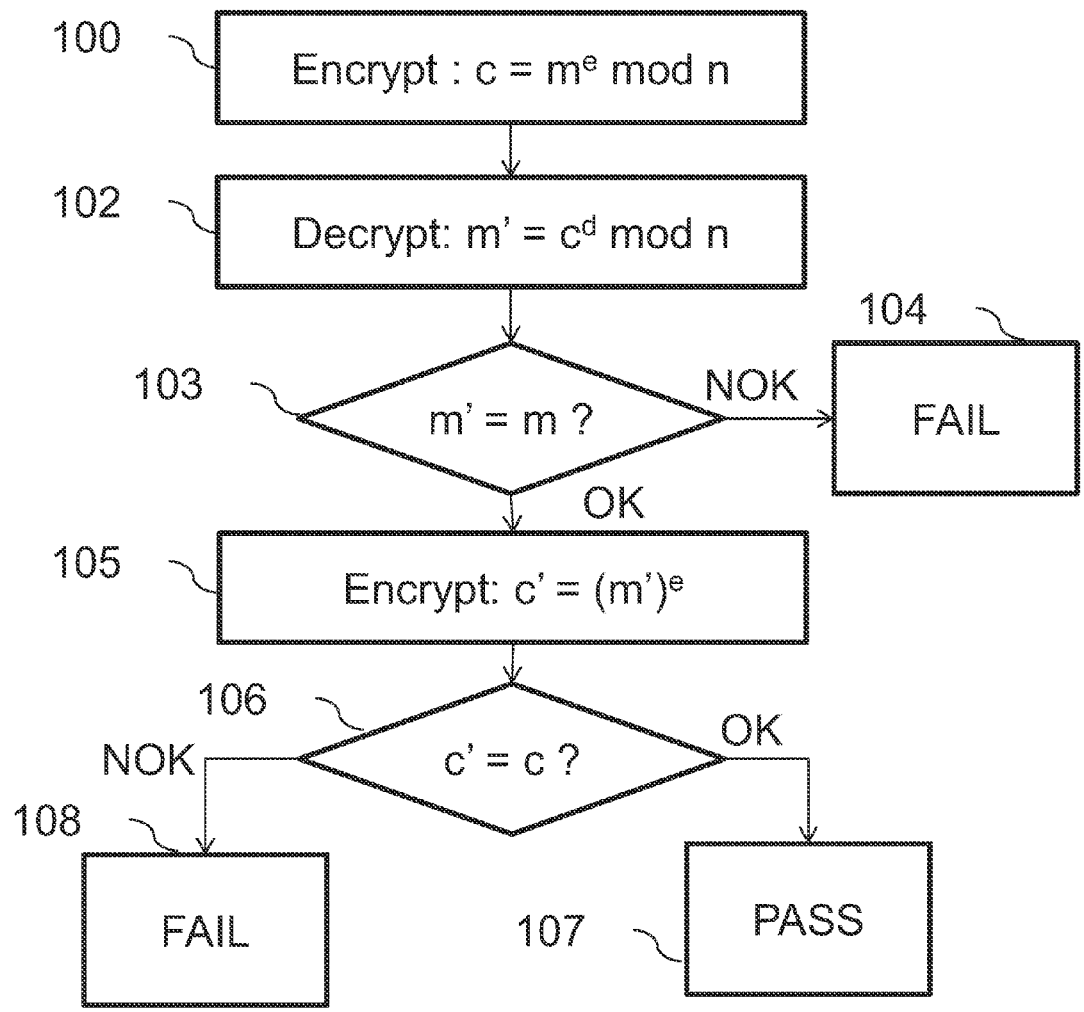
FIG. 1 shows a method for testing the integrity of key generation.

Then, as shown in FIG. 1, during a first step 100, a message m (m belonging to $Z_n$, the additive group of integers modulo n), is encrypted with the public exponent e in such a way as to obtain a first encrypted message $c=m^e$ mod n. Then, during step 102, the encrypted message c is decrypted with the private key d in such a way as to obtain a decrypted message $m'=c^d$ mod n.

It is then checked, during a step 103, whether the initial message m and the decrypted message are the same (m'=m). If not (NOK), it is determined in step 104 that the generated key pair is corrupted. If, on the contrary, the initial message m and the decrypted message are the same (OK), the decrypted message m' is encrypted, during a step 105, with the public exponent e in such a way as to obtain a second encrypted message $c'=(m')^e$ mod n.

It is then checked, during a step 106, whether the first encrypted message c and the second encrypted message c' are the same (c'=c). If so (OK), it is determined during step 107 that the integrity test has been passed. If not (NOK), it is determined, during step 108, that the generated key pair is corrupted.

Some corrupted key pairs can pass integrity tests such as the test described above or other tests from the prior art.

If, for example, instead of generating the private exponent d, a number d' is generated such that:

d'·e=1 mod λ(n)/α,

1≤α,

α divides λ(n),

For some messages, it may turn out that the key pair with the numbers d' and e passes the test whereas an error has occurred on the private exponent d.

As well as being a source of errors for a cryptographic system using keys, this may be a source of attacks by malicious third parties.

For example, the number d' may be generated by mistake if the calculation of the least common multiple of p-1 and q-1 (which must normally give λ(n)) is affected by an error. The number d' can be calculated by implementing the Euclidean algorithm. The integers a and b are calculated in such a way that e·a+b, λ(n)/α=1 (Bezout relation). The number d' is then obtained as d'=a mod λ(n)/α. Under these conditions, d'·e=1 mod λ(n)/α is in fact obtained.

By causing the determination of the number d' instead of the number d, an attacker can thus discover one of the secret factors (p and q) of the number n such that n=p·q.

In fact, assuming that the integer α divides a number $$\frac{(q-1)}{gcd(p-1, q-1)}$$

but without dividing the number $$\frac{(p-1)}{gcd(p-1, q-1)},$$

then by denoting the number as t such that $$t = \frac{(q-1)}{a, gcd(p-1, q-1)},$$

giving $d = e^{-1} \mod t.(p-1)$.

Thus, the private exponent is the inverse of the public exponent in the ring $Z_{p-1}$ instead of the ring $Z_{\lambda(n)}$. For a random message m, the following is then obtained:

$$(m^d)^e = m \bmod n,$$

but the following is also obtained:

$$(m^d)^e = m \bmod p.$$

A multiple of the factor p can thus be obtained as $(m^d)^e$-m mod n.

An attacker can thus disrupt the generation of keys and request the signature of random messages. For some messages m, the signature s obtained is such that $\gcd(s^e$-m, n) gives a factor of n.

Assuming that the least common multiple of p-1 and q-1 is calculated as follows, $$\lambda(n) = \frac{(p-1) \cdot (q-1)}{\gcd(p-1, q-1)},$$

where gcd(p-1, q-1) is the greatest common divisor of p-1 and q-1. If the calculation of this greatest common divisor gives α, gcd(p-1, q-1) (the product of α by gcd(p-1, q-1)) instead of gcd(p-1, q-1), d' is calculated instead of d.

The inventors have noted that the integrity tests currently used could fail to detect some key pair generation errors, notably during attacks as described above.

An attacker can cause errors in the calculation of the private exponent by means of side-channel observation of the operation of the device implementing the key generation then by means of a physical attack on the device in order to disrupt this operation. The attacker may, for example, use lasers to disrupt the device or to disrupt the power supply of said device.

By way of illustration, if an error α (as described above) is introduced in such a way that the number α divides the value k·λ(n)/α (k being an integer), and the number d' is determined instead of the number d such that d'·e=1+k·λ(n)/α, then an integrity test as defined, for example, in the FIPS 140-2 standard carried out on a message m of order s does not enable detection of the error if s divides k·λ(n)/α, whereas the integrity test detects whether or not s divides k·λ(n)/α. It must be remembered that the order s of the message m in the additive group is the number of times that the message m must to be added in order to obtain 1.

In fact, assuming that e, p and q are RSA parameters where n=p·q, if d'=$e^{-1}$ mod λ(n)/α is the incorrect exponent, the correct exponent being d=$e^{-1}$ mod λ(n), if d' is different from d then $\forall m \in Z^*_n$ such that $(m^e)^{d'} \neq m$ mod n. Furthermore, if $\forall m \in Z^*_n$, giving $(m^e)^{d'} = m$ mod n, then d=d'. This can be demonstrated, but is not shown here in the interests of brevity.

Methods enabling integrity tests to be rendered sensitive to this type of error are described below. The integrity tests can be carried out during or after the key generation.

Figure 2:
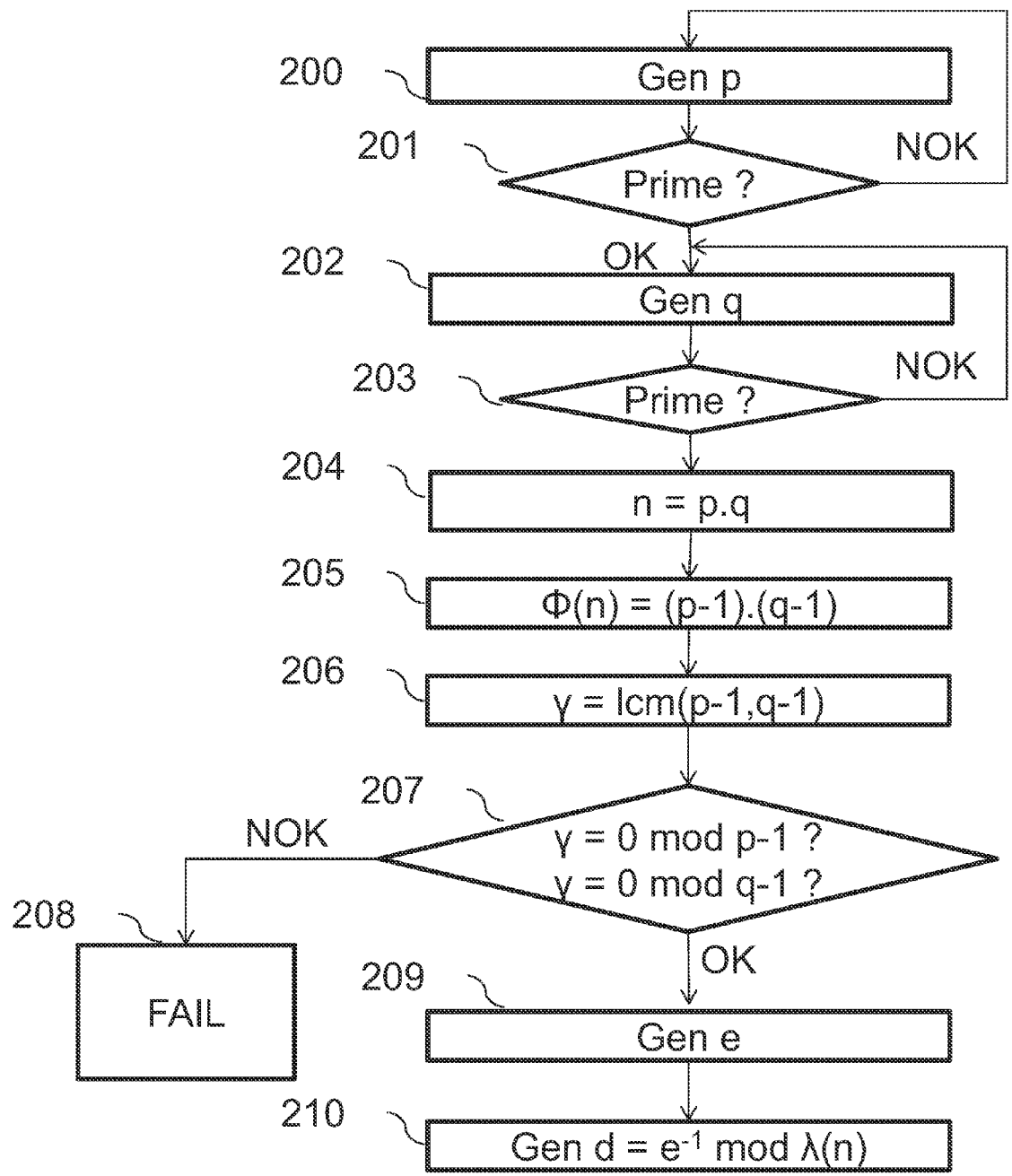
FIG. 2 shows a method for generating pairs of keys.

With reference to FIG. 2, a method for generating pairs of cryptographic keys is described in which the private cryptographic key is prevented from being corrupted by the calculation of the least common multiple.

During a step 200, a number p is generated randomly in $Z_n$. It is then checked during step 201 that the number p is a prime number. If not (NOK), step 200 is repeated. If p is indeed a prime number (OK), a number q is randomly generated in $Z_n$ in step 202. It is then checked during step 203 that the number q is a prime number. If not (NOK), step 203 is repeated. If q is indeed a prime number (OK), the product n of the numbers p and q (n=p·q) is calculated during step 204.

The following numbers are then calculated:
- the number Φ(n), during step 205, where Φ(n)=(p-1)·(q-1) (Φ being the Euler indicator function, or "totient"), and
- the number γ, during step 206, γ being the least common multiple of p-1 and q-1 only in the case where it is not incorrect (γ=lcm(p-1, q-1)).

The test in step 207 is then carried out, during which it is checked that γ is congruent to 0 modulo p-1 (γ=0 mod p-1) and that γ is congruent to 0 modulo q-1 (γ=0 mod q-1). If the test is not satisfactory (NOK), step 206 is repeated. Otherwise (OK), a message can be returned during a step 208. This message can inform a user that an incorrect key has been generated.

The public key is generated during step 209 with the calculation of the public exponent e such that:
- 1<e<Φ(n) and
- e and Φ(n) are prime numbers among themselves (gcd(e, Φ(n))=1), where Φ(n)=(p-1)·(q-1) (Φ being the Euler indicator function, or "totient").

The private key is generated during step 210 with the calculation of the number d such that d·e=1 mod Φ(n).

A method as described with reference to FIG. 2 offers increased security with a low additional calculation cost.

In fact, the possible errors during the calculation of one least common multiple (1 cm) are detected given that (demonstrated ad absurdum) if g=gcd(p-1, q-1) then λ(n)=(p-1)·(q-1)/g. Moreover, a number λ'(n) is assumed to exist such that λ'(n)=λ(n)/α=(p-1)·(q-1)/(α·g), where α is such that γ=0 mod p-1 and γ=0 mod q-1. Thus, λ'(n) mod p-1=0 λ'(n) mod q-1=0 is obtained. This indicates that (p-1)/(α·g) is an integer and that (q-1)/(α·g) also applies.

However, by definition of the greatest common divisor, there exists no integer β greater than g such that (p-1)/β and (q-1)/β are integers. The only possible value for α is therefore 1, which contradicts the initial hypothesis.

Figure 3:
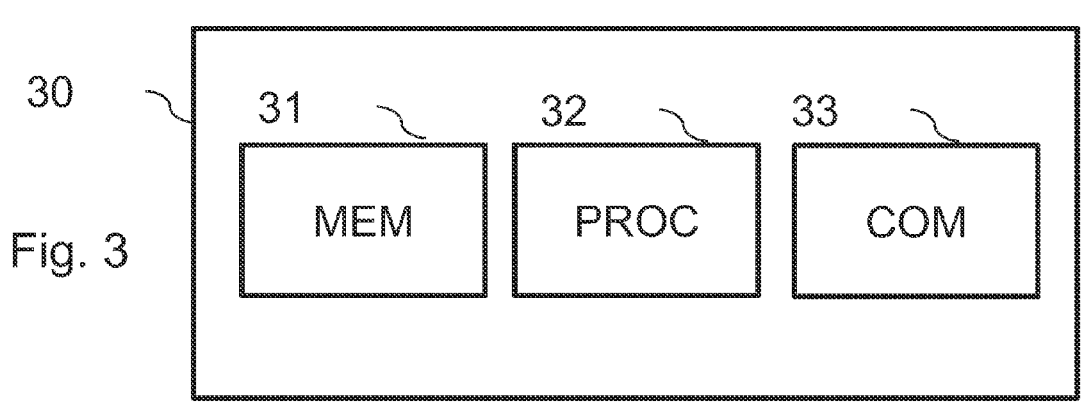
FIG. 3 shows schematically a device according to embodiments.

FIG. 3 shows schematically a device according to embodiments.

The device 30 shown in FIG. 3 comprises a memory unit 31 (MEM). This memory unit comprises a random access memory for non-durable storage of calculation data used during the performance of a method according to the invention, according to various embodiments. The memory unit furthermore comprises a non-volatile memory (for example an EEPROM) to store, for example, a computer program, according to one embodiment, for its execution by a processor (not shown) of a processing unit 31 (PROC) of the device.

The device furthermore comprises a communication unit 33 (COM), for example to exchange data with another device according to embodiments. The data exchanges between devices can be effected according to the APDU protocol, the acronym for "Application Protocol Data Unify", as defined in the standard ISO 7816 part 4.

The communication unit can thus comprise an input/output interface suitable for exchanging according to this protocol. The exchanged data can be obtained by means of APDU commands and responses to commands of this type.

A device according to embodiments may be compliant with the ISO 7816 standard. This may involve, for example, a chip card or a secure element.

A device according to embodiments is, for example, an integrated circuit.

The present invention has been described and illustrated in the present detailed description with reference to the attached figures. However, the present invention is not limited to the embodiments shown. Other variants, embodiments and combinations of characteristics can be inferred and implemented by the person skilled in the art on reading the present description and attached figures.

In the claims, the term "comprise" does not exclude other elements or other steps. The indefinite article "a(n)" does not exclude the plural. A single processor or a plurality of other units can be used to implement the invention. The different characteristics shown and/or claimed can be advantageously combined. Their presence in the description or in different dependent claims does not in fact exclude the possibility of combining them. The reference symbols should not be understood as limiting the scope of the invention.

The invention claimed is:

1. A method for cryptographically processing a message in a cryptographic system using encryption and/or digital signature mechanisms, the method comprising the following steps performed by an electronic cryptographic device comprising a processor of a cryptographic device in the cryptographic system:
   generating a pair of public and private cryptographic keys in the additive group of integers modulo n, where n is the product of two prime numbers p and q, and
   encrypting and/or digitally signing the message using the generated cryptographic keys, wherein generating the pair of public and private cryptographic keys comprises the following steps, performed by a processor of a cryptographic device in the cryptographic system:
   calculating (209) a public exponent e for said public key, and
   calculating (210) a private exponent d for said private key from said public exponent and said public modulus, where d·e=1 mod λ(n), λ(n) the least common multiple between p-1 and q-1,
      checking (207) that λ(n)=0 mod (p-1) and λ(n)=0 mod (q-1), before generating, in case of positive check, the public and private cryptographic keys from the calculated public and private exponents.

2. The method of claim 1, wherein electronic cryptographic device carrying out the method is portable.

3. The method of claim 1, wherein the electronic cryptographic device carrying out the method is portable.

4. A method for cryptographically processing a message in a cryptographic system using encryption and/or digital signature mechanisms, the method comprising the following steps performed by an electronic cryptographic device comprising a processor of a cryptographic device in the cryptographic system:
   generating, by a processor of an electronic cryptographic device in the cryptographic system, a public cryptographic key e and a private cryptographic key d in the additive group of integers modulo n, such that:
   n=p·q, where p and q are prime numbers,
   1<e<Φ(n), where e and Φ(n) are prime numbers among themselves and Φ(n)=(p-1)·(q-1), and
   d·e=1 mod λ(n), λ(n) being the least common multiple between p-1 and q-1,
      testing the security of the electronic cryptographic device against an attack, and
      encrypting and/or digitally signing the message using the generated cryptographic keys,
      wherein testing the security of the electronic cryptographic device against an attack includes a step of disrupting the calculation, by the processor of the electronic cryptographic device, of the value λ(n), in such a way as to obtain, instead and in place of the value λ(n), a value λ'(n)=λ(n)/α, where α divides λ(n), said disruption resulting in the calculation of a private key d', instead and in place of the private key d such that d'·e=1 mod λ(n)/α.

5. A non-transitory storage medium containing a computer program comprising instructions that when loaded in and executed by a processor of an electronic cryptography device in a cryptographic system, causes the electronic cryptography device in the cryptographic system to carry out a method for cryptographically processing a message in the cryptographic system using encryption and/or digital signature mechanisms, the method comprising the following steps performed by the cryptographic device:
   generating a pair of public and private cryptographic keys in the additive group of integers modulo n, where n is the product of two prime numbers p and q, and
   encrypting and/or digitally signing the message using the generated cryptographic keys, wherein generating the pair of public and private cryptographic keys comprises the following steps, performed by a processor of a cryptographic device in the cryptographic system:
   calculating (209) a public exponent e for said public key, and
   calculating (210) a private exponent d for said private key from said public exponent and said public modulus, where d·e=1 mod λ(n), λ(n) the least common multiple between p-1 and q-1,
      checking (207) that λ(n)=0 mod (p-1) and λ(n)=0 mod (q-1), before generating, in case of positive check, the public and private cryptographic keys from the calculated public and private exponents.

6. An electronic cryptographic device comprising a processor of a cryptographic device in a cryptographic system configured to carry out a method for cryptographically processing a message in the cryptographic system using encryption and/or digital signature mechanisms, the method comprising the following steps performed by the electronic cryptographic device in the cryptographic system:
   generating a pair of public and private cryptographic keys in the additive group of integers modulo n, where n is the product of two prime numbers p and q, and
   encrypting and/or digitally signing the message using the generated cryptographic keys, wherein generating the pair of public and private cryptographic keys comprises the following steps, performed by a processor of a cryptographic device in the cryptographic system:
   calculating (209) a public exponent e for said public key, and
   calculating (210) a private exponent d for said private key from said public exponent and said public modulus, where d·e=1 mod λ(n), λ(n) the least common multiple between p-1 and q-1,
      checking (207) that λ(n)=0 mod (p-1) and λ(n)=0 mod (q-1), before generating, in case of positive check, the public and private cryptographic keys from the calculated public and private exponents.

7. A non-transitory storage medium containing a computer program comprising instructions that when loaded in and executed by a processor of an electronic cryptography device in a cryptographic system, causes the electronic cryptography device in the cryptographic system to carry out a method for cryptographically processing a message in the cryptographic system using encryption and/or digital signature mechanisms, the method comprising the following steps performed by the cryptographic device:
  generating, by a processor of an electronic cryptographic device in the cryptographic system, a public cryptographic key e and a private cryptographic key d in the additive group of integers modulo n, such that:
    $n = p \cdot q$, where p and q are prime numbers,
    $1 < e < \Phi(n)$, where e and $\Phi(n)$ are prime numbers among themselves and $\Phi(n) = (p-1) \cdot (q-1)$, and
    $d \cdot e = 1 \bmod \lambda(n)$, $\lambda(n)$ being the least common multiple between p-1 and q-1,
      testing the security of the electronic cryptographic device against an attack, and
      encrypting and/or digitally signing the message using the generated cryptographic keys,
      wherein testing the security of the electronic cryptographic device against an attack includes a step of disrupting the calculation, by the processor of the electronic cryptographic device, of the value $\lambda(n)$, in such a way as to obtain, instead and in place of the value $\lambda(n)$, a value $\lambda'(n) = \lambda(n)/\alpha$, where $\alpha$ divides $\lambda(n)$, said disruption resulting in the calculation of a private key d', instead and in place of the private key d such that $d' \cdot e = 1 \bmod \lambda(n)/\alpha$.

8. An electronic cryptographic device comprising a processor of a cryptographic device in a cryptographic system configured to carry out a method for cryptographically processing a message in the cryptographic system using encryption and/or digital signature mechanisms, the method comprising the following steps performed by the electronic cryptographic device in the cryptographic system:
  generating, by a processor of an electronic cryptographic device in the cryptographic system, a public cryptographic key e and a private cryptographic key d in the additive group of integers modulo n, such that:
    $n = p \cdot q$, where p and q are prime numbers,
    $1 < e < \Phi(n)$, where e and $\Phi(n)$ are prime numbers among themselves and $\Phi(n) = (p-1) \cdot (q-1)$, and
    $d \cdot e = 1 \bmod \lambda(n)$, $\lambda(n)$ being the least common multiple between p-1 and q-1,
      testing the security of the electronic cryptographic device against an attack, and
      encrypting and/or digitally signing the message using the generated cryptographic keys,
  wherein testing the security of the electronic cryptographic device against an attack includes a step of disrupting the calculation, by the processor of the electronic cryptographic device, of the value $\lambda(n)$, in such a way as to obtain, instead and in place of the value $\lambda(n)$, a value $\lambda'(n) = \lambda(n)/\alpha$, where $\alpha$ divides $\lambda(n)$, said disruption resulting in the calculation of a private key d', instead and in place of the private key d such that $d' \cdot e = 1 \bmod \lambda(n)/\alpha$.

\* \* \* \* \*